United States Patent [19]

Demers et al.

[11] Patent Number: 4,760,457
[45] Date of Patent: Jul. 26, 1988

[54] SELF-FIXTURED KINESCOPE

[75] Inventors: Robert R. Demers, Lawrenceville; Kerry D. O'Mara, Trenton, both of N.J.; Francis J. Raab, Newtown, Pa.

[73] Assignee: RCA Licensing Corporation, Princeton, N.J.

[21] Appl. No.: 857,664

[22] Filed: Apr. 30, 1986

[51] Int. Cl.⁴ ............................................ H04N 5/655
[52] U.S. Cl. .................................... 358/249; 358/254; 315/368
[58] Field of Search ...................... 358/249, 248, 254; 315/368; 448/64

[56] References Cited

U.S. PATENT DOCUMENTS 4,261,013  4/1981  Renseen et al. ...................... 358/139
4,638,219  1/1987  Pons ..................................... 358/249

Primary Examiner—Edward L. Coles, Sr.
Attorney, Agent, or Firm—Eugene M. Whitacre; Paul J. Rasmussen; Eric P. Herrmann

[57] ABSTRACT

A pair of locating washers are applied over the holes in the bottom mounting lugs of the kinescope. The washers have apertures which are precisely referenced with respect to the position of the kinescope screen by using a pair of oppositely-disposed screen locating marks. The TV cabinet, on the other hand, is equipped with a pair of tapered guiding posts on the inside front surfaces thereof, which are similarly referenced relative to the rectangular opening of the cabinet. When the kinescope is loaded into the cabinet, the cabinet guiding posts are received into the kinescope-mounted locating washers to assure registration between the kinescope screen and the cabinet opening. The kinescope is fixedly secured to the cabinet by a plurality of screws.

17 Claims, 4 Drawing Sheets

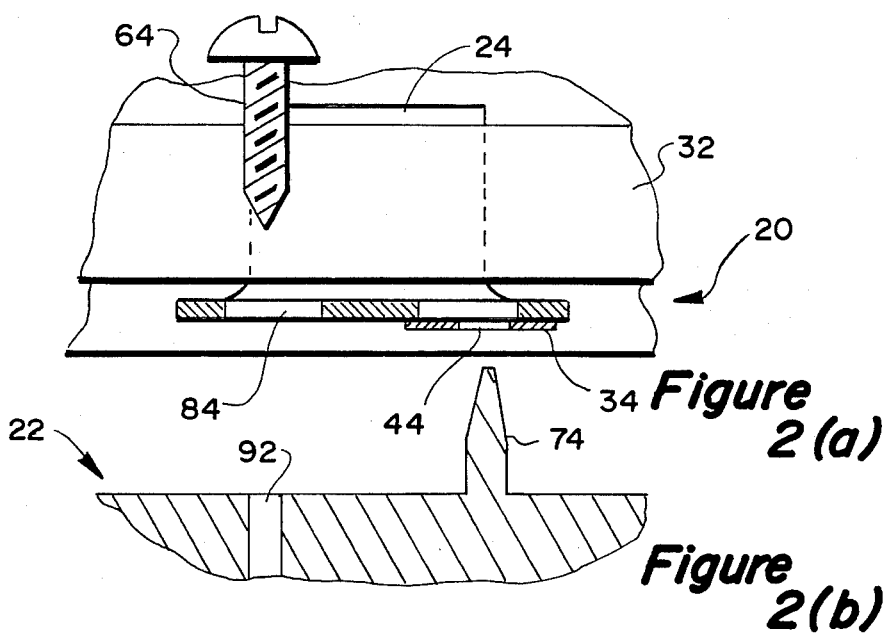
*Figure 2(a)*
*Figure 2(b)*
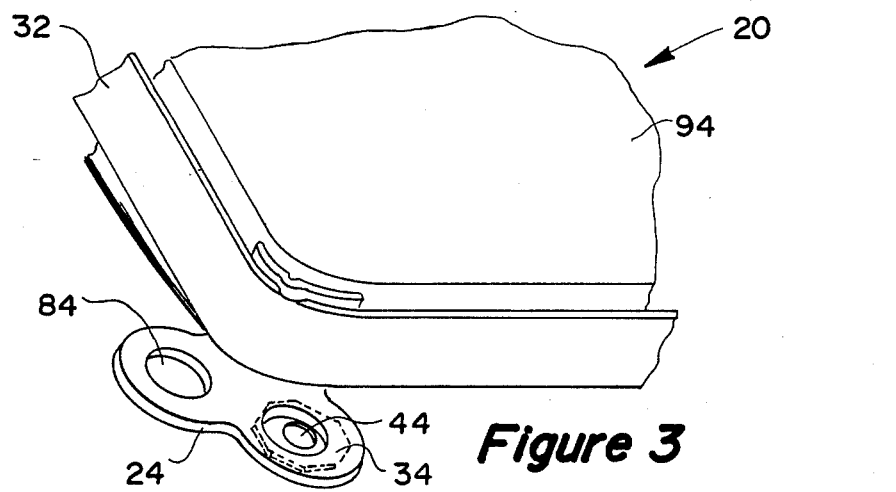
*Figure 3*
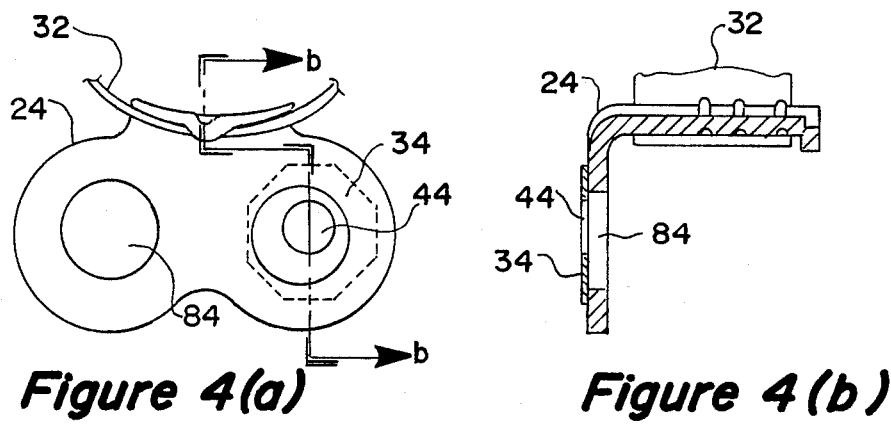
*Figure 4(a)*　　　*Figure 4(b)*

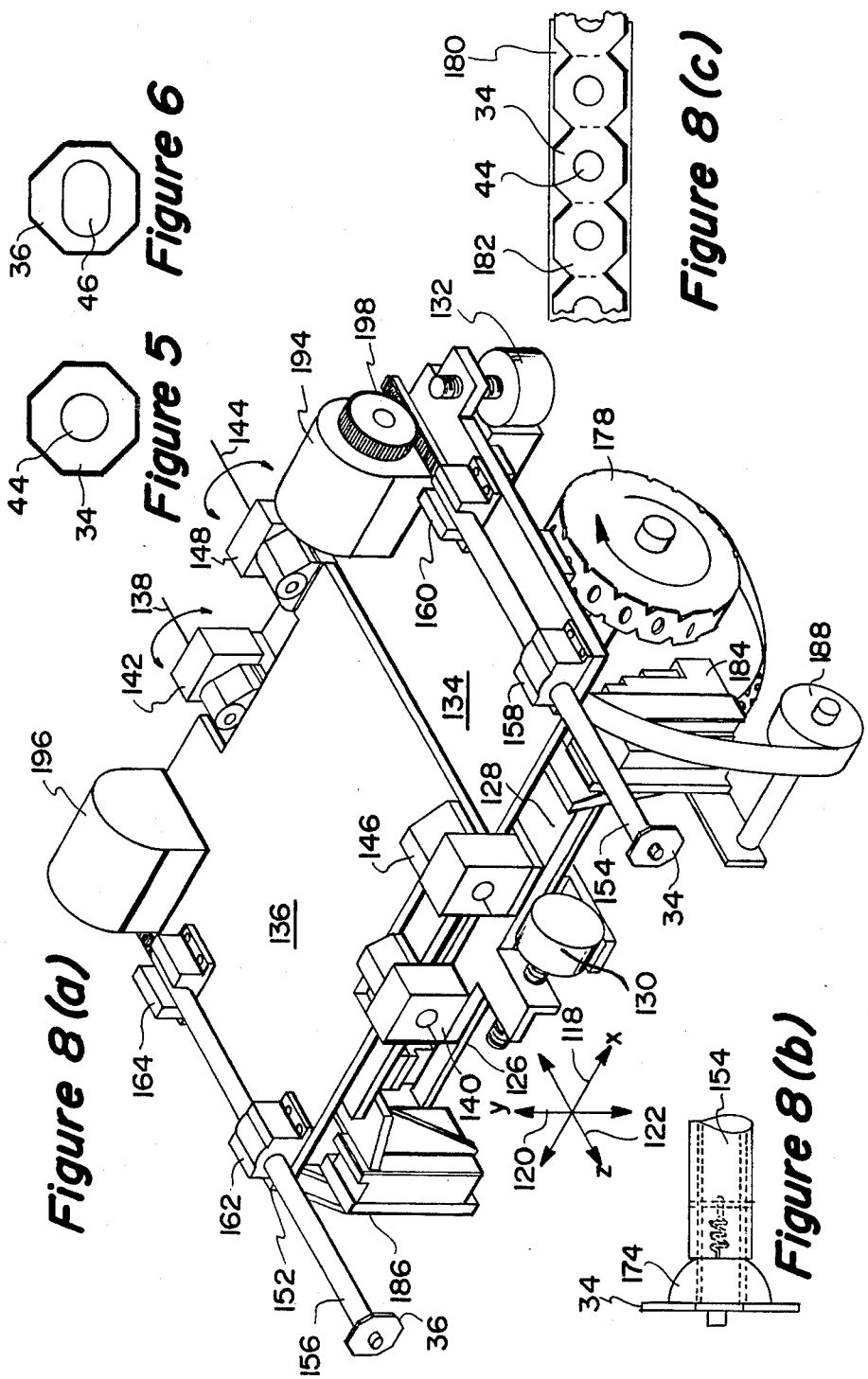

SELF-FIXTURED KINESCOPE

This invention relates to television assembly techniques, which allow automatic centering of the kinescope screen with respect to the screen opening in the television cabinet.

BACKGROUND

A kinescope is typically provided with 4 mounting lugs at the respective corners. During assembly, the kinescope is mated with the television (TV) cabinet and screws are driven through the holes in the mounting lugs to fixedly secure the kinescope to the cabinet.

After assembly of the kinescope to the cabinet, the electron gun assembly of the kinescope is activated to see if there is any misalignment between the raster produced on the TV screen and the cabinet opening. The screen misalignment is manifested as black edges between the lighted raster and the bezel or rim defining the cabinet opening. If there is any misalignment, the screws holding the kinescope are loosened, the position of the kinescope is readjusted, and the screws are then retightened. The holes in the mounting lugs are purposely made larger than the kinescope mounting screws, so that the position of the kinescope can be readjusted after loosening the screws. This technique is time-consuming and costly.

The problem of correct positioning of the kinescope screen is further compounded by the minimal overlap (e.g., 0.015 inches) between the screen (i.e., phosphor area) and the bezel surrounding the cabinet opening. Other factors—such as manufacturing variations involved in the positioning of the kinescope mounting lugs, etc., also contribute to the difficulty of correctly positioning the kinescope screen relative to the cabinet opening.

SUMMARY OF INVENTION

In accordance with the present invention, two of the kinescope mounting lugs are equipped with accurately-positioned washers prior to the assembly of the kinescope to the cabinet. The cabinet is provided with a pair of tapered guiding posts on the inner front surfaces thereof, which are designed to closely fit the apertures in the washers during kinescope assembly. The kinescope is automatically located upon reception of the guiding posts in the washers, thereby eliminating the need for subsequent realignment. The screws are driven through the holes in the mounting lugs, while the cabinet guiding posts are firmly seated in the kinescope-mounted washers, to fixedly secure the kinescope to the cabinet.

IN THE DRAWINGS

FIG. 1 (a)-(f) represent a manufacturing scenario depicting the automatic assembly of the kinescope to the cabinet, where both the kinescope and the cabinet are provided with the screen locating features in accordance with the present invention;

FIGS. 2 (a) and (b) respectively show the cross-sectional views of a cabinet guiding post poised for entry into an associated, kinescope-mounted locating washer pursuant to this invention;

FIG. 3 shows a perspective view of a corner portion of the kinescope having a mounting lug secured thereto by means of a tension band;

FIGS. 4 (a) and (b) respectively illustrate a front view and a cross-sectional side view of the mounting lug of FIG. 3;

FIG. 5 is the front view of the locating washer of FIGS. 2 (a), 3, 4 (a) and 3 (b);

FIG. 6 illustrates the front view of another locating washer disposed on the opposed bottom mounting lug of the kinescope;

Figure 1A:
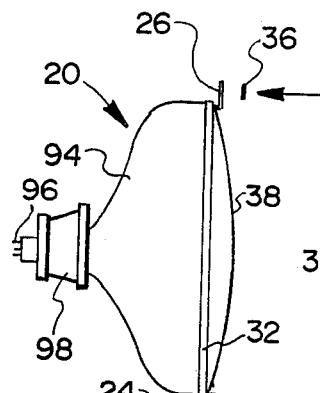
Figure 1B:
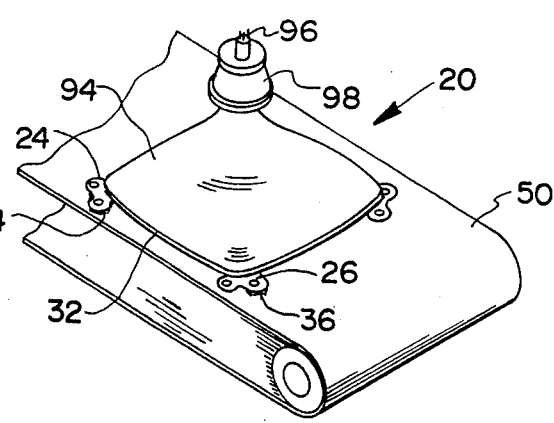
Figure 1C:
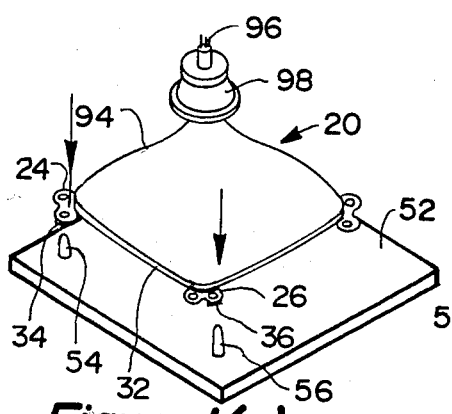
Figure 1D:
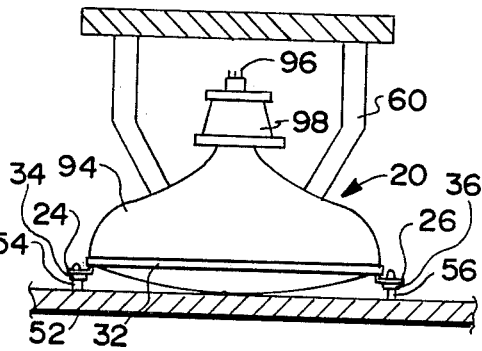
Figure 1E:
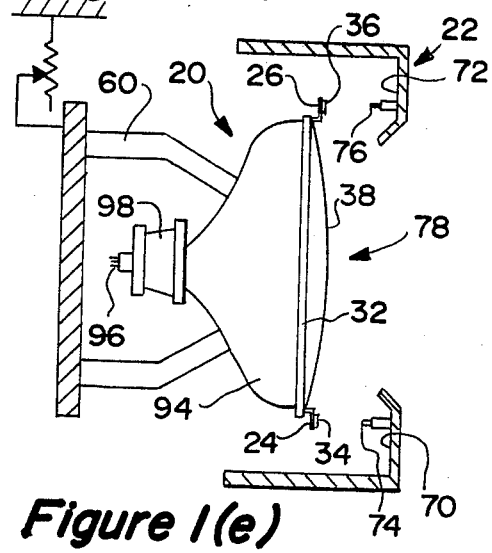
Figure 1F:
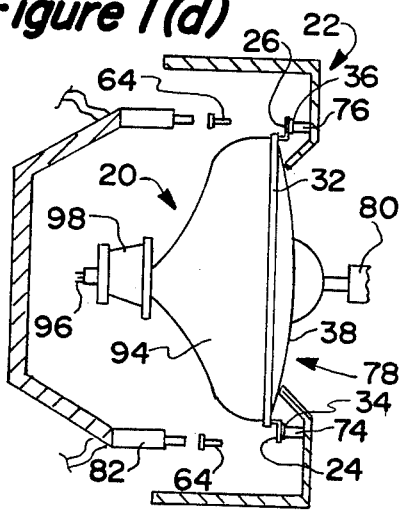
Figure 7:
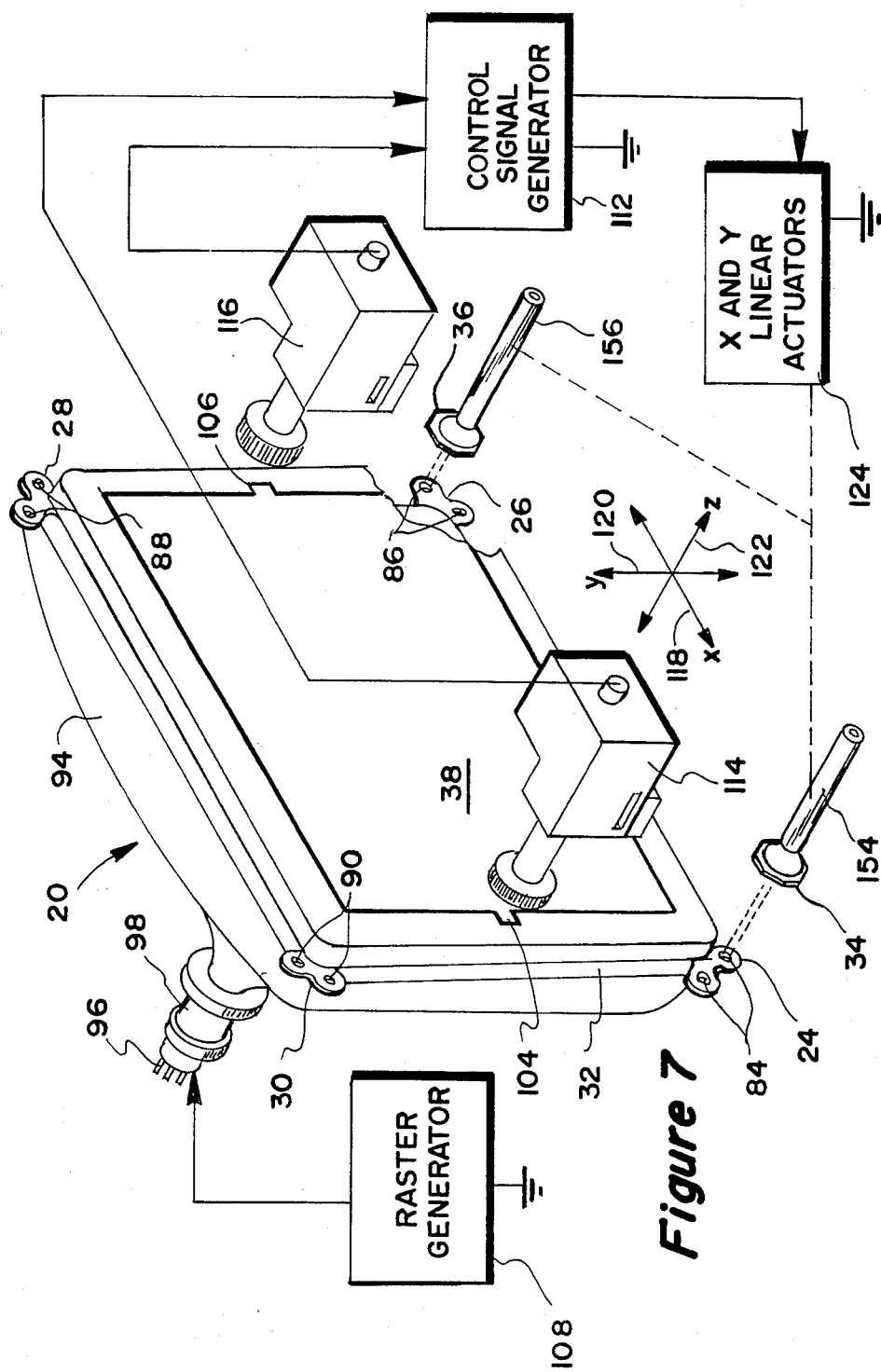

FIG. 7 schematically shows the equipment used for positioning a pair of locating washers—one against the mounting lug on each of the two lower corners of the kinescope; and FIGS. 8 (a) through (c) diagrammatically depict the equipment for attaching the locating washers to the respective lugs on the kinescope.

DETAILED DESCRIPTION

FIGS. 1 (a) through (f) show automated assembly of a kinescope 20 to a TV cabinet 22 in accordance with the principles of the subject invention. A set of four mounting lugs 24, 26, 28 and 30 (see FIG. 7) are secured to the kinescope 20 at each of the four corners by means of a tension band 32. A pair of locating washers 34 and 36 are accurately positioned against the two lower lugs 24 and 26 of the kinescope 20. The washers 34 and 36 may be affixed to the respective lugs 24 and 26 by any suitable means—e.g., spot welding, adhesive backing, heat-activated adhesive, etc.

Although the washers 34 and 36 in this particular embodiment are affixed to the bottom kinescope mounting lugs 24 and 26, they may be applied to any other suitable combination of the mounting lugs—for example, top two lugs.

The kinescope 20, having the accurately-positioned locating washers 34 and 36, is transported to the instrument assembly station on a conveyor 50, where it is placed, facedown, on a pallet 52. The pallet 52 is equipped with a pair of locating studs 54 and 56, which are subject to reception in the apertures 44 and 46 (FIGS. 4 and 5) in the respective washers 34 and 36 in order to precisely position and orient the kinescope 20 on the pallet.

A pick-and-place device 60 (e.g., robot) lifts the kinescope 20 from the pallet 52, and turns it over to make it upright in the manner indicated in FIG. 1 (e). The pick-and-place device 60 consistently picks up the kinescope 20 at the same location relative to the mounting lugs 24 and 26, because of the engagement between the pallet-mounted studs 54 and 56 and the kinescope-mounted washers 34 and 36.

The front inner walls 70 and 72 of the TV cabinet 22 are equipped with a pair of tapered guiding posts 74 and 76 as shown in FIG. 1 (e). The position of the guiding posts 74 and 76 with respect to a cabinet opening 78 is arranged to be the same as the position of the locating washers 34 and 36 relative to the kinescope screen 38. When the kinescope 20 is mated with the cabinet 22, the tapered guiding posts 74 and 76 are respectively received in the apertures 44 and 46 in the locating washers 34 and 36, in the manner indicated in FIGS. 2 (a) and (b), to center the screen 38 with respect to the cabinet opening 78.

It will be noted that the guiding posts 74 and 76 on the respective front inner surfaces 70 and 72 can be integrally molded with the plastic TV cabinet 22. In the case of non-plastic console cabinets (e.g., made from wood), the guiding posts 74 and 76 may be integrally molded on a plastic support frame used for securing the kinescope to the non-plastic cabinet.

After the kinescope 20 is positioned with respect to the cabinet 22, a suction gripper disposed at the end of a mechanical arm 80 enters the cabinet through the opening 78 to hold the kinescope in place. The pick-and-place device 60 is then withdrawn to make room for a screw-driving mecnanism 82. The screw-driving mechanism 82 inserts the screws, indicated by numeral 64, through the respective holes 84, 86, 88 and 90 in the mounting lugs 24–30 (FIG. 7) to fixedly secure the kinescope 20 to the cabinet 22.

FIGS. 3, 4 (a) and 4 (b) show the details of one of the bottom mounting lugs—namely 24, and the associated locating washer 34. Each of the mounting lugs 24–30 has two holes for screws 64 used to fixedly secure the kinescope 20 to the TV cabinet 22. The holes in the kinescope mounting lugs are purposely made larger than the kinescope mounting screws in order to ensure that mounting lug holes always match up with the screw holes in the cabinet—indicated by numeral 92 in FIG. 2 (b). In this particular embodiment, the diameter of the mounting lug holes is approximately 0.512 inches, and the diameter of the kinescope mounting screws is about 0.219 inches.

The locating washers 34 and 36 are fabricated from a thin sheet of metal (e.g., cold rolled steel),—about 0.010 to 0.015 inches thick. The locating washers 34 and 36 have an octagonal cross-section as depicted in FIGS. 5 and 6. The flat-to-flat dimenison of the locating washers 34 and 36 is about 0.625 inches.

The aperture 44 in the locating washer 34 has a circular cross-section, with a diameter of about 0.250 to 0.252 inches. In contrast, the aperture 46 in the locating washer 36 is elongated as shown in FIG. 6. The short dimension of the elongated aperture 46 is the same as the diameter of the circular aperture 44 in the washer 34—about 0.250 to 0.252 inches, and the long dimension is about 0.450 inches.

The washer 34 with a circular hole serves to locate the kinescope 20 in both the horizontal (x) and vertical (y) directions with respect to the TV cabinet 22. On the other hand, the washer 36 has a slotted hole to provide angular positioning of the kinescope 20 relative to the cabinet 22 without the need for having tight tolerances on the spacing between the cabinet guiding posts 74 and 76 in the manner explained later.

As indicated in FIG. 7, the kinescope 20 includes an evacuated glass envelope 94. The front portion of the envelope 94 is the previously-mentioned display screen 38. A plurality of red, green and blue phosphor elements are deposited on the inside surface of the display screen 38. Disposed within the envelope 94 is a slotted mask (not shown) having slots registered with the respective phosphor elements. At the other end of the envelope 94 is an electron gun assembly 96, which, when activated, produces three electron beams directed toward the phosphor elements on the display screen 38.

A deflection yoke 98 is disposed around the neck portion of the glass envelope 94. Upon energization, the yoke 98 generates a magnetic field for deflecting the electron beams to form a lighted raster on the display 38.

The design of the electron gun assembly 96 is such that the three electron beams converge at all points on the aperture mask. The three beams pass through the apertures in the mask and impinge upon the respective one of the red, green and blue phosphor elements. The phosphor elements, when excited by electron beams, emit light to produce images on the screen 38.

Typically, the deflection yoke 98 is permanently secured to the kinescope 20 before the assembly of the kinescope to the TV cabinet 22. Prior to the permanent attachment of the yoke 98 to the kinescope 20, its axial position, angular orientation and tilt, etc., are manipulated on a yoke alignment machine (or YAMMING machine) to make centering, convergence and purity adjustments on the kinescope. To facilitate centering of the electron beams with respect to the display screen 38, the phosphor elements on the inside of the screen are arranged to define a pair of oppositely-disposed screen locating marks 104 and 106—commonly known as the yoke alignment slots or YAS marks.

The yoke alignment slots 104 and 106 on the display screen 38 are normally not easily noticeable to the naked eye. When the electron gun assembly 96 and the deflection yoke 98 are activated to scan a raster on the display screen 38, the YAS marks 104 and 106 become visible. To generate raster, the kinescope 20 is hooked up to a raster generator 108. The raster generator 108 provides appropriate grid and anode voltages to the electron gun assembly 96. Additionally, it applies appropriate deflection currents to the horizontal and vertical windings of the deflection yoke 98.

A pair of optical sensors 114 and 116 have their viewing fields focussed in the regions surrounding the YAS marks 104 and 106. The optical sensors 114 and 116 may be in the form of TV cameras or CCD imaging devices. The outputs of the optical sensors 114 and 116 are fed to a control signal generator 112. The control signal generator 112 produces a control signal representative of the position of the display screen 38 with respect to a pair of mutually perpendicular, x and y axes 118 and 120. These x and y axes 118 and 120 are respectively parallel and perpendicular to a line joining the oppositely-disposed YAS marks 104 and 106. In response to the control signal, the x and y linear actuators 124 position the locating washers 34 and 36 against the respective mounting lugs 24 and 26.

In the case of kinescopes without the YAS marks, it is possible to lncate the screen position by finding the edges of the lit-up TV screen 38. This might be done simply and inexpensively by using three linear arrays of photo detectors—such as the Fairchild I-SCAN unit. The information from these sensors can be used to drive the linear actuators, indicated by numeral 124, that are used to position the two locating washers 34 and 36 over the respective mounting lugs 24 and 26.

Although the kinescope 20 is turned on in this particular embodiment to make the edges of the display screen and the YAS marks 104 and 106 visible to the optical sensors 114 and 116, it is not necessary to do so. Alternately, it is possible to sense the screen position without illuminating the display screen 38, for example, in the manner shown in U.S. Pat. No. 4,261,013 (Renseen et al.). The Renseen et al. apparatus includes a pair of screen sensors mounted on a vertically movable member at a separation equal to the vertical dimension of the display screen. Each sensor directs a light beam at the kinescope screen and detects the reflected beam. The sensors are moved until the detector outputs are equal, indicating that the two sensors are located at similar positions with respect to the top and bottom screen edges. The midpoint between the two sensors is then the location of the horizontal centerline of the display screen. Another pair of screen edge sensors may be used to locate the vertical centerline of the screen in a similar fashion.

FIG. 8 illustrates the equipment used for applying the locating washers 34 and 36 over the respective one of the holes 84 and 86 in the associated kinescope mounting lugs 24 and 26. As previously indicated, these washers 34 and 36 have smaller apertures 44 and 46 (i.e., 0.250 inches in diameter) compared to the mounting lug holes 84 and 86 (i.e., 0.512 inches), and are precisely positioned with respect to the display screen 38.

The washer application equipment includes a stationary frame 126. A base plate 128 is translatably mounted on the stationary frame 126 for motion along the horizontal or x-direction 118. A linear actuator 130 adjusts the position of the base plate 128 in the x-direction 118 in response to the control signal indicative of the position of the screen 38.

To allow adjustment of the locating washers in the vertical or y-direction 120, a pair of plates 134 and 136 are pivotally mounted on the base plate 128. The plate 134 is pivoted about an axis 138 defined by a pair of bearing blocks 140 and 142 mounted on the reciprocably-mounted base plate 128. The other plate 136 is pivoted about a parallel axis 144 formed by another pair of bearing blocks 146 and 148 also secured to the reciprocably-mounted base plate 128. Both of the pivot axes 138 and 144 are disposed parallel to each other, and perpendicular to the x-y plane.

The rotational radii of the pivotally-mounted plates 134 and 136 are so large that the angular motion of these plates causes essentially vertical or y displacement of the respective free ends 150 and 152. A pair of linear actuators, indicated by numeral 132 in FIG. 8, adjust the vertical positions of the free ends 150 and 152 of the respective plates 134 and 136 in response to the control signal indicative of the position of the screen 38.

A pair of tubes 154 and 156 are reciprocably mounted on the respective plates 134 and 136 for motion along a z-direction 122. A pair of bearing blocks 158 and 160 disposed on the pivotally-mounted plate 134 slidably support the tube 154. The other tube 156 is similarly mounted by means of another pair of bearing blocks 162 and 164, secured to the pivotally-mounted plate 136.

Disposed at the free ends of the tubes 154 and 156 are respective suction holders, indicated by numeral 174 in FIG. 8 (b), for capturing the respective washers 34 and 36. The swivel motion of the suction holders (e.g., 174) permits the locating washers 34 and 36 to automatically align with the planes of the respective kinescope mounting lugs 24 and 26 when they are brought into contact therewith. The vacuum within the tubes 154 and 156 serves to firmly hold the washers 34 and 36 in place until they are permanently secured to the respective lugs 24 and 26.

It will be noted that the spacing between the washers 34 and 36 in the x-direction is not adjustable because the respective bearing blocks 140, 142 and 146, 148 for both of the pivotally-mounted plates 134 and 136 are fixedly disposed on the base plate 128. Therefore, the tubes 154 and 156, carrying the respective locating washers 34 and 36, move together in the x-direction 118. However, the oblong aperture 46 in the locating washer 36 makes it unnecessary to precisely adjust the spacing between the washers 34 and 36 in the horizontal or x direction.

The locating washers 34 and 36 are fed to the washer application equipment in a strip form from respective reels—indicated by numeral 178. The washers are supplied on a plastic backing film 180 having an adhesive layer arranged between the film and the washer strip 182 in the manner depicted in FIG. 8 (c). When the washers are peeled from the backing film 180, the adhesive stays on the washers and is released from the film. As the washer strips are fed by respective mechanisms 184 and 186, the backing films are peeled away and wound on associated reels—indicated by numeral 188.

Instead of supplying the washers 34 and 36 in a strip form, they may be supplied individually from a cartridge dispenser. Furthermore, other techniques may be used for attaching the washers 34 and 36 to the respective kinescope mounting lugs 24 and 26—for example, spot welding, hot-melt adhesive, etc.

The tubes 154 and 156 are fully retracted to allow the washer feeding mechanisms 184 and 186 to raise the washers 34 and 36 to the respective positions where they can be captured by the associated swivel holders. As the tubes 154 and 156 are moved forward, the washers 34 and 36 are sheared from the respective strips, and picked up by the swivel holders.

The motion of the tubes 154 and 156 is provided by a pair of drive motors 194 and 196 via respective rack-and-pinion mechanisms—indicated by numeral 198. As the tubes 154 and 156 are moved forward, the locating washers 34 and 36, with adhesive sides facing the respective kinescope mounting lugs 24 and 26, come into contact with the lugs. The drive motors 194 and 196 continue to press the locating washers 34 and 36 against the lugs 24 and 26 until a preset force is achieved. At this point, the drive motors 194 and 196 stall. Once the vacuum is released, the washers 34 and 36 are firmly pressed against the mounting lugs 24 and 26. The drive motors 194 and 196 are then reversed to withdraw the tubes 154 and 156 away from the kinescope 20. The kinescope 20 is then transported to the instrument assembly station on the conveyor 50 as indicated in FIG. 1 (b).

As previously mentioned, the positions of the locating washers 34 and 36 are set before their application to the lugs 24 and 26 by adjusting the position of the translatably-mounted base plate 128 in the horizontal direction and by adjusting the positions of the pivotally-mounted plates 134 and 136 in the vertical directions in response to the control signal. The locating washer 34 with a circular aperture is precisely located in both horizontal and vertical directions. The locating washer 36 with an oblong aperture is, however, positioned only in the vertical direction.

The locating washer 34, with a close-fitting circular aperture, positions the kinescope 20 with respect to the TV cabinet 22 in both horizontal and vertical directions. The second locating washer 36, with a slotted aperture, controls only the angular orientation of the kinescope 20 with respect to the cabinet 22. The two washers 34 and 36, in combination, accurately position the kinescope 20 in the x-y plane without the need for tight tolerances on the spacing between the cabinet guiding posts 74 and 76 and without the need for adjusting the spacing between the washers.

One application of the kinescope locating features pursuant to this invention is to assure accurate registration between the kinescope screen 38 and the cabinet opening 78. Another application of the subject kinescope locating features is to accurately position the kinescope on the assembly line for robotic wiring, instrument alignment and test, etc. The kinescope locating features are also useful for precisely positioning the kinescope on the pallet so that it can be picked up by an automatic pick-and-place device or a robot.

It is noted that it may be desirable to apply the locating washers to the kinescope mounting lugs at the YAMMING station. As previously indicated, the YAS marks are sensed at the YAMMING station for the purpose of centering the vertical and horizontal magnetic fields of the deflection yoke. The YAS mark information can be temporarily stored and later used for positioning the locating washers over the respective mounting lug holes before the kinescopes leave the YAMMING station. This technique eliminates the need for sensing the YAS marks a second time around.

What is claimed is:

1. A method for positioning a kinescope having a display screen; said display screen being provided with a pair of oppositely-disposed yoke alignment slots; said method comprising the steps of:

illuminating said display screen to produce a raster thereon;

optically detecting the respective locations of said oppositely-disposed yoke alignment slots of said lit-up screen to generate a position-indicative control signal representative of the position of said display screen with reference to a pair of mutually perpendicular directions respectively parallel to and perpendicular to an axis joining said oppositely-disposed yoke alignment slots; and providing said kinescope with a mechanical locating feature having a certain relationship with respect to said display screen in response to said control signal.

2. The method defined in claim 1 wherein said step of optically detecting said yoke alignment slots comprises locating said slots by means of a pair of optical sensors having their viewing fields respectively focussed on the regions surrounding the nominal positions of said slots.

3. The method defined in claim 1 for use with a television cabinet for housing said kinescope; said cabinet having an opening for exposing said display screen; said cabinet being further equipped with a mechanical locating feature bearing the same relationship with respect to said screen opening as said relationship of said kinescope locating feature with respect to said display screen; wherein said steps of generating said raster, optically detecting said yoke alignment slots and providing said kinescope with said mechanical locating feature are all performed prior to assembly of said kinescope to said cabinet.

4. The method defined in claim 3 further including the steps of:

mating said kinescope with said cabinet in a manner causing engagement between said locating features to assure registration between said display screen and said cabinet opening; and fixedly attaching said kinescope to said cabinet while said locating features remain in engagement with each other.

5. The method defined in claim 4 wherein said cabinet locating feature is in the form of a pair of guiding posts disposed on the front inner walls of said cabinet and having said relationship with respect to said screen opening; wherein said step of providing said kinescope with said locating feature comprises the steps of:

positioning a pair of apertured washers with respect to said kinescope in response to said control signal such that the apertures in said washers, dimensioned to snugly receive said guiding posts in said cabinet, bear said relationship relative to said kinescope screen; and affixing said apertured washers to said kinescope at the respective positions determined by said control signal so that when said kinescope is mated with said cabinet, said guiding posts in said cabinet closely fit into said apertures in said kinescope-mounted washers to center said display screen with respect to said cabinet opening.

6. The method defined in claim 5, wherein said cabinet guiding posts define a circular in cross-section; wherein one of said washers is provided with a circular aperture dimensioned to snugly receive the respective one of said guiding posts; wherein the other of said washers is provided with an oblong aperture having respective short and long dimensions that are slightly and substantially greater than the diameter of the other of said guiding posts; wherein said step of positioning said washers consists of:

positioning said one washer having said circular aperture with respect to said kinescope along both of said mutually perpendicular directions in response to said control signal;

positioning said other washer having said oblong aperture with respect to said kinescope such that the long dimension of said oblong aperture is substantially parallel to one of said mutually perpendicular directions; and further positioning said other washer with respect to said kinescope only along the other of said mutually-perpendicular directions in response to said control signal.

7. The method defined in claim 5 further including the step of providing said kinescope with a plurality of mounting brackets having holes through which fasteners are driven into said cabinet walls during said kinescope/cabinet assembly; wherein said mounting bracket holes are made substantially larger than said cabinet guiding posts; wherein said apertured washers are aligned and affixed over the respective ones of said mounting bracket holes, so that said apertures in said washers engage respective guiding posts to the exclusion of said mounting bracket holes to center said display screen with respect to said cabinet opening.

8. The method defined in claim 5 wherein said step of affixing said apertured washers to said kinescope comprises gluing said washers to said mounting brackets disposed on said kinescope.

9. The method defined in claim 5 wherein said step of affixing said apertured washers to said kinescope comprises welding said washers to said mounting brackets disposed on said kinescope.

10. The method defined in claim 5 wherein said step of affixing said washers to said kinescope comprises the steps of:

feeding washers in a strip form from a pair of reels;
  severing the leading washers from the respective strips;
  transporting said severed washers to said respective positions relative to said kinescope; and
  attaching said washers to said kinescope at said respective positions.

11. The method defined in claim 5 for use with a non-plastic cabinet having an injection-molded plastic kinescope mounting frame provided with integrally-molded kinescope guiding posts.

12. The method defined in claim 5 for use with an injection-molded plastic cabinet having integrally-molded kinescope guiding posts.

13. In a kinescope provided with a display screen having a pair of oppositely-disposed yoke alignment slot marks (YAS marks); said kinescope further including a postioning device comprising:
   a locating feature; and
   means for fixedly securing said locating feature to said kinescope such that said locating feature is precisely located with respect to said YAS marks of said display screen.

14. The kinescope positioning device defined in claim 13 for use with a kinescope having a mounting lug disposed at each corner thereof; said mounting lugs having holes for kinescope mounting screws; said locating feature comprises a pair of washers disposed over said kinescope mounting holes such that the apertures in said washers are precisely positioned with respect to said YAS marks of said kinescope display screen.

15. The kinescope positioning device defined in claim 14 wherein said fixedly securing means comprises adhesive material disposed between said locating washers and the respective ones of said mounting lugs.

16. A method for positioning a kinescope having a display screen; said display screen being provided with a yoke alignment mark; said method comprising the steps of:
   optically detecting the location of said yoke alignment mark to generate a position-indicative control signal representative of the position of said display screen; and
   providing said kinescope with a mechanical locating feature having a certain relationship with respect to said display screen in response to said control signal.

17. In a kinescope provided with a display screen having a yoke alignment mark; said kinescope further including a positioning device comprising:
   a locating feature; and
   means for fixedly securing said locating feature to said kinescope such that said locating feature is precisely located with respect to said yoke alignment mark of said display screen.

* * * * *